United States Patent
Yoshida

4,048,475
Sept. 13, 1977

[54] APPARATUS FOR CHECKING THE USER OF A CARD IN CARD-ACTUATED MACHINES

[75] Inventor: Shinya Yoshida, Takatsuki, Japan

[73] Assignee: Omron Tateisi Electronics Company, Kyoto, Japan

[21] Appl. No.: 735,276

[22] Filed: Oct. 26, 1976

Related U.S. Application Data

[63] Continuation of Ser. No. 553,568, Feb. 27, 1975, abandoned.

[30] Foreign Application Priority Data

Mar. 7, 1974 Japan .................. 49-26964

[51] Int. Cl.² .................. H04Q 1/30; G06K 7/00
[52] U.S. Cl. .................. 235/61.7 B; 340/149 A
[58] Field of Search .................. 235/61.7 B, 61.11 D, 235/61.11 E, 61.7 R, 61.9 R; 200/46; 197/19; 178/22; 340/149 A, 172.5, 146.3 AG

[56] References Cited

U.S. PATENT DOCUMENTS

| | | | |
|---|---|---|---|
| 3,221,304 | 11/1965 | Enikeieff | 340/149 A |
| 3,513,298 | 5/1970 | Riddle | 235/61.11 D |
| 3,657,521 | 4/1972 | Constable | 235/61.7 B |
| 3,665,162 | 5/1972 | Yamamoto | 235/61.7 B |
| 3,740,530 | 6/1973 | Hoffer | 235/61.7 B |
| 3,761,682 | 9/1973 | Barnes | 235/61.7 B |
| 3,764,742 | 10/1973 | Abbott | 178/22 |
| 3,846,622 | 11/1974 | Meyer | 235/61.7 B |

*Primary Examiner*—Robert M. Kilgore
*Attorney, Agent, or Firm*—Christensen, O'Connor, Garrison & Havelka

[57] ABSTRACT

A system for checking the user of a card in a card-actuated machine such as automatic cash dispenser, wherein the card has recorded thereon two kinds of coded information for collation, which are changed every time the card is used.

20 Claims, 5 Drawing Figures

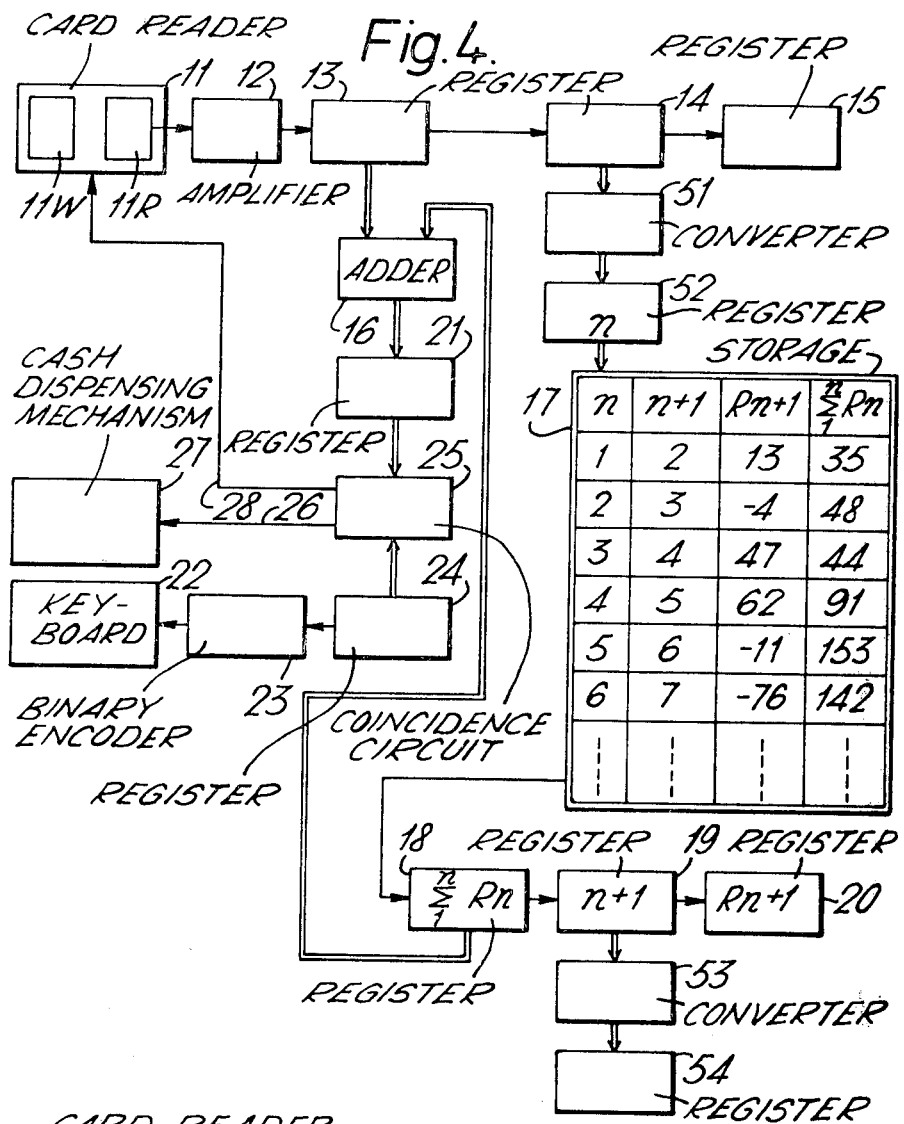
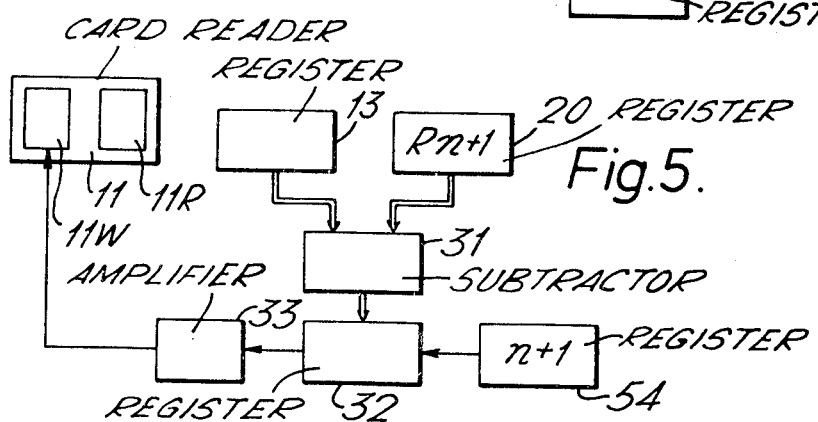

APPARATUS FOR CHECKING THE USER OF A CARD IN CARD-ACTUATED MACHINES

This is a continuation, of application Ser. No. 553,568, filed Feb. 27, 1975, abandoned.

This invention relates to a system for checking the user of a card used in a card-actuated machine such as an automatic cash dispenser.

In a modern banking or article vending system, credit cards are widely used. Such cards generally have some information visibly printed and other information invisibly recorded thereon. In an automatic cash dispensing system, for example, the necessary infromation to be recorded on the card includes the bank number, the account number, the balance of the account, a cipher, etc. which are, for example, magnetically recorded on the card. The cipher is, for example, a number specific to the owner of the card, and when the card is used, the user is requested to enter the specific number into the machine. The machine checks whether the number entered by the user of the card coincides with the number recorded on the card. If the two numbers coincide, the machine recognizes the user of the card as the proper owner thereof and dispenses the requested amount of cash.

If the number recorded on the card and the number specific to the owner of the card are the same, a problem arises when the card is lost or stolen to pass into unauthorized hands. The number recorded on the card can magnetically be read, so that an unauthorized person can know the number and fraudulently use the card as if he was the proper owner of the card.

In order to prevent such fraudulent use of the card, it has been proposed to record on the card a number which is different from, but has a certain relation to, the number specific to the owner of the card. In this case, even if an unauthorized holder of the card has been able to know the number recorded on the card, he could not know the number specific to the owner of the card directly from the number read from the card. However, if the unauthorized holder of the card has come to know the relation between the number recorded on the card and the number specific to the true owner of the card in some way or other, he can attain the number specific to the owner from the number read from the card.

Accordingly, the primary object of the invention is to provide a system for checking whether the user of a card used in an automatic card-actuated machine is the proper owner of the card.

Another object of the invention is to provide such a checking system as aforesaid, wherein even when an improper holder of the card has come to know the code or cipher recorded on the card, it is impossible for the improper holder to know the code or cipher specific to the proper owner of the card from the cipher he has read from the card.

Another object of the invention is to provide such a checking system as aforesaid, wherein the code or cipher recorded on the card is changed every time the card is used.

Another object of the invention is to provide such a checking system as aforesaid, wherein the card has at least two kinds of codes recorded thereon so that every time the card is used, both of the codes are changed in such a manner that when the card is used next time, one of the changed codes is operated so as to become identical with the code specific to the proper owner of the card.

Another object of the invention is to provide such a checking system as aforesaid, wherein the code specific to the owner of the card is not changed, but the code recorded on the card is changed whenever the card is used.

Another object of the invention is to provide such a checking system as aforesaid, wherein when the card is used, the code on the card is read and a code having a predetermined relation to the code read from the card is obtained, so that the code thus obtained is compared with the code entered by the user of the card so as to check whether the two codes coincide, and a new code having a predetermined relation to the code on the card is recorded on the card in place of the previous code thereon and then the card is returned to the owner.

In order to attain the above objects, in one embodiment of the invention at least two coded numbers, that is, a first and a second coded number are recorded on the card. When the card is used in an automatic cash dispenser for example, the two numbers are read, and a predetermined operation is performed on them to produce a third number. On the other hand, the user of the card enters into the machine his card owner number, with which the above third number is compared. If the two numbers coincide, the user of the card is identified with the proper owner of the card.

The numbers recorded on the card are then changed, so that when the card is used next time and a predetermined operation is performed on one of the changed numbers, it will become equal to the card owner number. Therefore, even if an improper holder of the card has come to know the number recorded on the card, it would be almost impossible to know from that number the number specific to the owner, that is, the card owner number. However, since the card owner number is not changed, the true owner of the card need not memorize a new card owner number every time he uses the card.

One of the two numbers recorded on the card is the number which indicates the number $i$ of times the card will have been used next time. This number will be referred to as "the number of times of use of the card" or simply "the number of times of use". The other number recorded on the card is the number obtained by subtracting from the card owner number the total sum of the squares of all the numbers from 1 through $i$, that is, the number of times of use. This number will be referred to as the "auxiliary card number".

When the card is used, the two numbers, that is, the number of times of use and the auxiliary card number are read from the card, and the above-mentioned total sum of the squares of 1 through $i$ is calculated from the former number. If this sum is added to the latter number, that is, the auxiliary card number, the resultant number will become equal to the card owner number.

On the other hand, the user of the card is requested to enter into the machine what he memorizes as his card owner number. The number entered by the user is then compared with the above-mentioned resultant number to check whether the two numbers coincide thereby determining whether the user of the card is the proper owner thereof.

When the user of the card has been recognized as the proper owner of the card, the machine operates accordingly to dispense, say, an article or cash or render a service.

On the card the number $i$ is rewritten as $i+1$, which means that next time the card is used, it will have been used ($i+1$) times, and the number obtained by subtracting the square of ($i+1$) from the auxiliary card number read from the card is recorded on the card as the new auxiliary number instead of the previous auxiliary card number. Then the card with the rewritten information is returned to the user.

Instead of a number an alphabetic letter may be used as a cipher for expressing the number of times of use of the card. In this case each of the alphabetic letters used must correspond to a specific number which indicates the number of times of use. When the alphabetic letter has been read from the card, it is converted to the corresponding number, so that the previously mentioned operation will be performed.

In a modified embodiment of the invention, one of the two kinds of numbers recorded on the card is a number corresponding to the number $i$ of times of use of the card just as in the previous embodiment of the invention. However, the other number is a number obtained by subtracting from the card owner number the sum of predetermined random numbers R1 through R$i$. Each of the random numbers corresponds to one of the numbers 1 through $i$ each expressing the number of times of use. For example, a first random number R1 is previously determined to correspond to the first use of the card; a second random number is previously determined to correspond to the second use of the card; and so on. When the card is used for the $i$th time, the number $i$ of times of use and the auxiliary card number are read, and the sum of the random numbers R1 through R$i$ is obtained. If the sum is added to the auxiliary card number, the resultant number will be equal to the card owner number. Then this number is compared with the number entered by the user as the card owner number so as to check whether the two numbers coincide.

After use, the number $i$ on the card is changed to $i+1$ which means that next time the card is used, it will be the ($i+1$)th time, and the number obtained by subtraction of the predetermined random number R$i$ corresponding to the number $i$ from the auxiliary card number is recorded on the card as a new auxiliary car number instead of the previous auxiliary card number. Then the card with the rewritten information is returned to the owner for future use.

The invention will be described in further detail with reference to the accompanying drawings, wherein:

FIG. 4 is a block diagram of another embodiment of the invention; and

FIG. 5 is a block diagram of a device for recording new coded information on the card to be returned to the owner after use in the system of FIG. 4.

Figure 1:
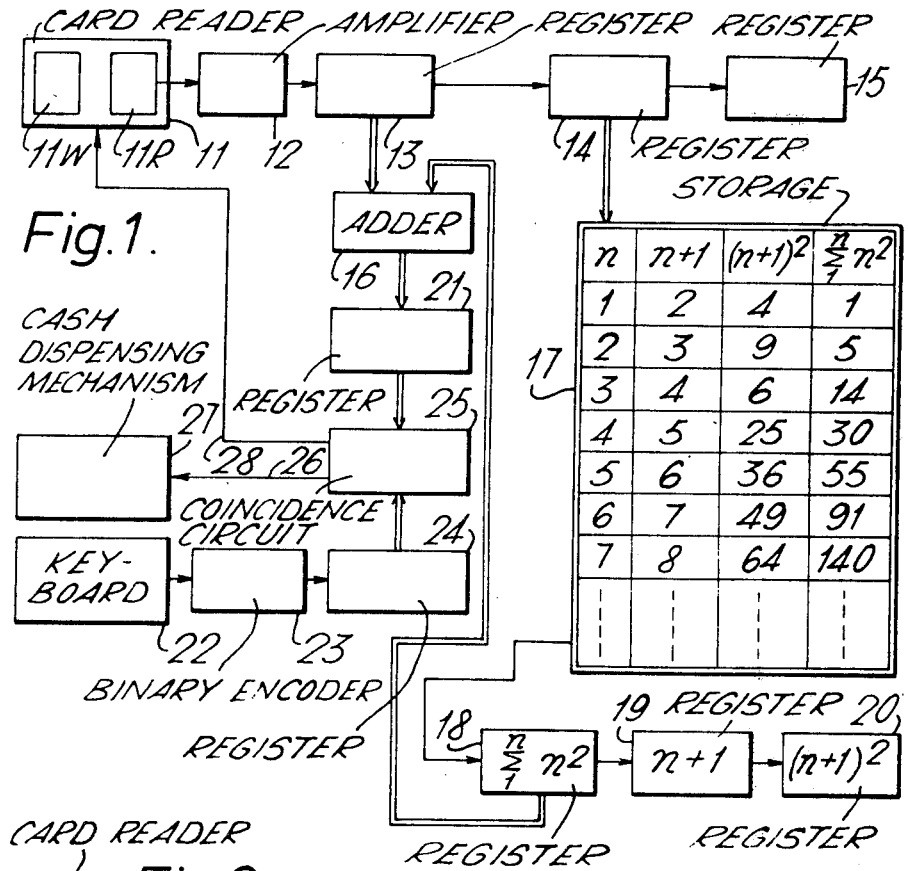
FIG. 1 is a block diagram of one embodiment of the invention.

Referring to FIG. 1, a card having coded information magnetically recorded thereon is inserted by the holder of the card into the machine, wherein a card reader 11 comprising a reading head 11R and a writing head 11W reads the information recorded on the card. The information includes a cipher as well as the bank number, the account number and the balance of the account. The cipher information includes two kinds of information, one being the number of times of use of the card, while the other is the auxiliary card record number.

The information read by the card reader is amplified by an amplifier 12 and then stored in registers 13, 14 and 15. The register 13 stores the auxiliary card number; the register 14 stores the number of times of use of the card; and the register 15 stores the above-mentioned other information.

The information stored in the register 13 is applied as one input to an adder 16. A storage or memory 17 stores the values of three different functions with the number of times of use of the card being a variable of the functions. In the following the number of times of use of the card will be referred to simply as the number of times of use. If the number of times of use is given as $n$, the three functions are $n+1$, $(n+1)^2$, and $$\sum_{1}^{n} n^2.$$

As shown in FIG. 1 the values of the three functions are stored in the storage 17 with the number $n$ being an address. Those values of the three functions which correspond to the number of times of use as stored in the register 14 are taken out of the storage 17 so as to be stored in registers 18, 19 and 20. That is, the register 18 stores the value of the function $$\sum_{1}^{n} n^2;$$

the register 19 stores the value of the function $n+1$; and the register 20 stores the value of the function $(n+1)^2$. The value stored in the register 18 is applied to the other input of the adder 16, which adds the values received from the registers 13 and 18. The result of the addition is stored in a register 21.

When the user of the card puts his card into the machine, he manipulates a keyboard 22 to enter his card owner number. The card owner number is converted by a binary encoder 23 to a binary code, which is stored in a register 24.

The contents of the registers 21 and 24 are applied to a coincidence circuit 25 to check whether the two contents coincide. If they coincide, the circuit 25 produces an output on a line 26 to be applied to a cash dispensing mechnism 27. The information stored in the register 15 and the requested amount of money entered through the keyboard are checked by known suitable devices, not shown, and if these informations have been found valid and when the signal appears on the line 26, the cash dispensing mechanism operates to dispense the requested amount of cash in a well known manner.

If the coincidence circuit 25 recognizes disagreement of the contents of the registers 21 and 24, it produces an output on a line 28. This means that the user of the card has not been recognized as the proper owner of the card, so that the output signal is used to cause the card reader 11 to return the card to the user.

Figure 2:
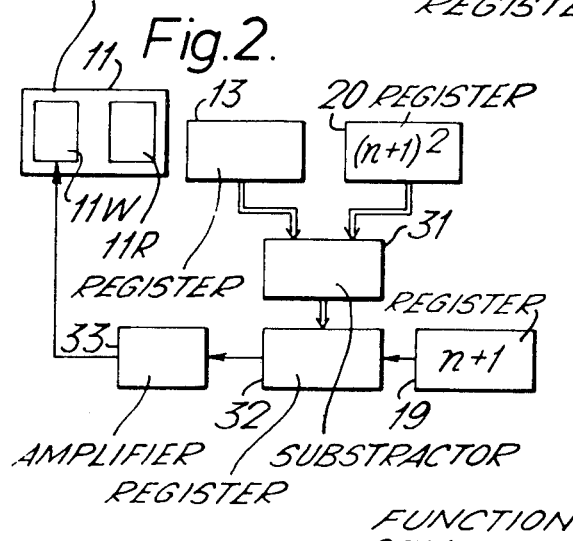
FIG. 2 is a block diagram of a device for recording new coded information on the card to be returned to the owner after use in the system of FIG. 1.

After production of the signal on the line 26, the information on the card is rewritten by a device shown in FIG. 2, wherein the same reference symbols as in FIG. 1 denote corresponding elements. The contents of the registers 13 and 20 in FIG. 1 are applied to a subtractor 31, which subtracts the number stored in the register 20 from the number stored in the register 13, and the result of the subtractions is stored in the register 32.

The contents of the registers 19 and 32 are successively amplified by an amplifier 33 and applied to the writing head 11W of the card reader, which writes the contents of the register 19 as the new number of times of use and the contents of the register 32 as the new auxiliary card number in place of the old record on the card.

Suppose that the card owner number is 1000. When the card is issued, the number of times of use is recorded on the card as 1 (which means that when the card is used next time, it is used for the first time), and the auxiliary card number is recorded on the card as 999.

When the card has been used for the first time, the auxiliary card number 999 is stored in the register 13, the number 1 expressing the number of times of use is stored in the register 14.

- By the number 1 stored in the register 14 access is made to the values of the three functions in address No. 1 in the storage 17. Since $n=1$, the value of the function $n+1$ is 2; the value of the function $(n+1)^2$ is 4; and the value of the function $$\sum_{1}^{n} n^2$$

is 1. These values are taken out of the storage 17 to be registered in the registers 18, 19 and 20, respectively.

The contents of the registers 13 and 18 are added by the adder 16 so that the result of the addition becomes 1000. This number is stored in the register 21. If the card owner number entered through the keyboard 22 is 1000, the coincidence circuit 25 produces an output on the line 26.

The auxiliary card number 999 stored in the register 13 and the number 4 stored in the register 20 are applied to the subtractor 32, so that the result of the subtraction becomes 995, which is stored in the register 32. This number 995 and the number 2 ($n+1$) stored in the register 19 are written by the writing 11W on the card in place of the previous information recorded thereon. Thus the card returned to the user after the first use thereof has newly recorded thereon 2 as the number of times of use and 995 as the auxiliary card number. The number 2 means that the card has already been used one time, and that the card will next be used for the second time.

When the card has been used for the second time, the register 13 stores 995 and the register 14 stores 2, so that the number 2 stored in the register 14 causes the values 3, 9, 5 of the three functions corresponding to $n=2$ are taken out of the storage 17. The number 5 is obtained from $$\sum_{1}^{n} n^2,$$

that is, $1^2+2^2$. The contents of the registers 13 and 18 are added by the adder 16 to produce 1000. The contents of the registers 13 and 20 are applied to the subtractor 31 wherein subtraction of $995-9$ is conducted to give 986. Thus the card returned after it has been used for the second time has recorded thereon 3 as the number of times of use and 986 as the auxiliary card number.

Similarly, when the card has been used for the third time, the register 13 stores 986 and the register 18 stores 14 ($=1^2+2^2+3^2$), so that the sum of these two numbers is 1000. Since the register 20 now stores 16, the register 32 stores 970 ($=986-16$), so that 4 as the number of times of use and 970 as the auxiliary card number are recorded on the card in place of the previous record thereon, which will be returned to the user of the card.

TABLE I shows how the auxiliary card number changes every time the card has been used.

TABLE I

| NUMBER OF TIMES OF USE | BEFORE USE | AFTER USE |
|---|---|---|
| 1 | 999 | 995 |
| 2 | 995 | 986 |
| 3 | 986 | 970 |
| 4 | 970 | 945 |
| 5 | 945 | 909 |
| 6 | 909 | 860 |
| . | . | . |
| . | . | . |

As can be easily understood from the foregoing description and the above TABLE, when the card has been used for the $i$th time (e.g. the second time), the auxiliary card number which has been rewritten on the card is always such a number (e.g. 986) that the sum of this number (986) and the value (e.g. 14) of the function $$\sum_{1}^{n} n^2$$

which will be obtained when the card is next used for the $(i+1)$th time (e.g. the third time) becomes equal to the card owner number 1000. In other words, the auxiliary card number rewritten when the card has been used for the $i$th time and the number to be added thereto when the card is next used for the $(i+1)$th time are compliments to each other of the card owner number. The number to be added when the card is used for the $(i+1)$th time is changed so that the auxiliary card number is also changed every time the card is used.

Figure 3:
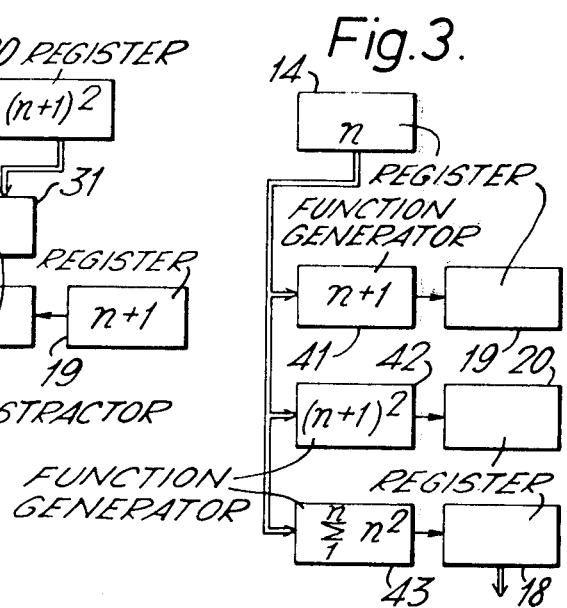
FIG. 3 is a block diagram showing a modification of a portion of FIG. 1.

In the embodiment of FIG. 1, the storage 17 is employed, which stores the values of the functions which are addressed by means of the number of times of use. Instead of the storage 17 function generators may be employed as shown in FIG. 3. In FIG. 3 the data $n$ in the register 14 are applied to three function generators 41, 42 and 43. The function generator 41 performs the operation of $n+1$; the function generator 42 performs the operation of $(n+1)^2$; and the function generator 43 performs the operation of $$\sum_{1}^{n} n^2.$$

The results of these operations are stored in registers 19, 20 and 21, respectively.

As the information which expresses the number of times of use of the card, other kinds of codes than numbers, for example, alphabetic letters may also be used. In this case the aliphabetic letter read by the card reader is converted to a corresponding number so that the above-mentioned operations are performed as will be described later with reference to FIG. 4.

In FIG. 2, the number to be subtracted from the auxiliary card number after use of the card is a value of the function $(n+1)^2$ the variable of which is the number of times of use $n$. In the embodiment of FIG. 4, however, a random number is used for the same purpose as shown at $R_{n+1}$ in the storage 17. Therefore, the input to be applied to the adder 16 is expressed as $$\sum_{1}^{n} R_n.$$

The number of times of use is expressed by an alphabetical letter which is recorded as a corresponding code on the card. When the card is used, the code expressing the alphabetic letter is read by the card reader 11 and stored in the register 14. The code stored in the register 14 is converted by a converter 51 to the corresponding number of times of use, which is stored in a register 52.

The data in the storage 17 are read out in accordance with the number $n$ stored in the register 52. The read out number $(n+1)$ is stored in the register 19 and converted by a converter 53 to a corresponding alphabetic letter to be stored in a register 54.

Table II shows by way of example the relation between the alphabetic letters and the corresponding numbers of times of use.

TABLE II

| NUMBER OF TIMES OF USE | ALPHABETIC LETTERS |
|---|---|
| 1 | K |
| 2 | D |
| 3 | T |
| 4 | A |
| 5 | F |
| . | . |
| . | . |

In the embodiment of FIG. 4, the card owner number is 1000 and when the card is issued, the auxiliary card number 965 and the letter K are recorded on the card.

When the card has been used for the first time, the register 13 stores 965 and the register 14 stores K, which is converted by the converter 51 to the number 1 to be stored in the register 52. By the number 1 stored in the register 52, the values 2, 13 and 35 are read out of the storage 17 so as to be stored in the registers 19, 20 and 18, respectively.

The data in the registers 13 and 18 are added by the adder 16 to become 1000. Therefore, if the number entered by the user of the card through the keyboard 22 is 1000, a signal is produced on the line 26, whereas if the entered number is not 1000, a signal is produced on the line 28.

The data in the register 19, that is 2 is converted by the converter 53 to the alphabetic letter D to be stored in the register 54. The data in the registers 13 and 20, that is, the numbers 965 and 13 are applied to the subtractor 31, wherein the latter is subtracted from the former to produce 952, which is stored in the register 32. The data in the registers 32 and 54 are applied through the amplifier 33 to the writing head 11W, which writes on the card the numbers 2 and 952 as the number of times of use and the auxiliary card number in place of the previous records thereon.

As previously mentioned, the number $R_{n+1}$ is any desired random number. The auxiliary card number 965 that is first recorded when the card is issued is a number obtained by subtracting 35, that is, the value of $$\sum_{1}^{n} R_n$$

when $n=1$ from the card owner number 1000.

TABLE III shows how the auxiliary card number is changed in the embodiment of FIG. 4 every time the card is used.

TABLE III

| NUMBER OF TIMES OF USE | BEFORE USE | AFTER USE |
|---|---|---|
| 1 | 965 | 952 |
| 2 | 952 | 956 |
| 3 | 956 | 909 |
| 4 | 909 | 847 |
| 5 | 847 | 858 |
| . | . | . |
| . | . | . |

As will be easily understood from the above description and TABLE III, the sum of the auxiliary card number rewritten when the card has been used for the $i$th time and the value of $$\sum_{1}^{n} R_n$$

when the card is next used for the $(i+1)$th time is always equal to the card owner number. In other words, the rewritten auxiliary card number and the number to be added thereto the next time the card is used are compliments to each other of the card owner number. In this case, too, since the number to be added is changed every time the card is used, the auxiliary card number is accordingly changed every time the card is used.

In the above embodiments, the number of times of use of the card is used as one of the two parameters recorded on the card. Instead of the number of times of use, the date or the time when the card is used may also be used for the same purpose.

However, when the number of times of use is used as the parameter, it is possible to limit excess use of the card by checking the number of times of use recorded on the card when it is used. The use of the card may be limited in the number of times the card is allowed to be used during a predetermined period of time, e.g., in one day, week, month or year, or the total allowed number of times of use may be limited. Also, by checking the number of times of use recorded on the card it is possible for the owner to recognize if the card has been used by others without authorization.

The card owner number may be any other number, say, 5819 than 1000 in the illustrated embodiments. The card owner number may be chosen by the owner himself.

The invention is applicable not only to automatic cash dispensers but also automatic article vending machines, POS (point of sales) terminal machines, security gate systems, etc.

What I claim is:

1. A system for checking the user of a card having recorded thereon coded information including at least a first and a second code, wherein said first code is representative of the number of times of use of said card in said system, said system comprising: means for reading said codes; means responsive to said first code read by said reading means to produce a third code, said third code having a predetermined mathematical relationship with said first code; means operated by the user of said card to enter a card owner code; computational means responsive to said reading means and said means for producing said third code for mathematically combining said second code with said third code, said computational means including coincidence checking means for comparing said entered card owner code with said mathematically combined second and third codes, said coincidence checking means supplying a control signal when said entered card owner code corresponds to said mathematically combined second and third codes; and code changing means responsive to said control signal supplied by said coincidence checking means for changing both said first and second codes on said card, said code changing means increasing said first code by one and changing said second code such that said mathematically combined second and third codes will correspond to said card owner code the next time said card is used in said system.

2. The system of claim 1, wherein said means for producing said third code comprises a storage which is addressed by said first code read by said reading means to produce said third code.

3. The system of claim 1, wherein said means for producing said third code comprises function generating means responsive to said first code read by said reading means, said function generating means performing a predetermined mathematical operation so as to produce said third code.

4. The system of claim 1, wherein said means for producing said third code comprises a storage which stores random numbers which are addressed by said first code read by said reading means so as to be supplied as said third code.

5. The system of claim 2, wherein said first code expresses an alphabetic letter corresponding to the number of times of use of said card.

6. The system of claim 4, wherein said first code expresses an alphabetic letter corresponding to the number of times of use of said card.

7. A system for checking the user of a card having recorded thereon coded information including a first number $n$ and a second number, the former number expressing the number of times of use of said card, comprising: means for reading said first and second numbers; a first register for storing said first number $n$; a second register for storing said second number; means associated with said first register to produce values of the functions $n+1$, $(n+1)^2$ and $$\sum_{1}^{n} n^2;$$

a third register for storing the value of the function $n+1$; a fourth register for storing the value of the function $(n+1)^2$; a fifth register for storing the value of the function $$\sum_{1}^{n} n^2;$$

means operated by the user of said card to enter a third number; sixth register for storing said entered third number; an adder for adding said second number stored in said second register and said value of the function $$\sum_{1}^{n} n^2$$

stored in said fifth register to produce a fourth number; means for comparing said third and fourth number to recognize said user as the proper owner of said card when said third and fourth numbers coincide; a subtractor for subtracting the value of the function $(n+1)^2$ stored in said fourth register from said second number stored in said second register to produce a fifth number; and means for recording said fifth number and the value of said function $n+1$ stored in said third register on said card in place of said second and first numbers previously recorded thereon, respectively.

8. A system for checking the user of a card having recorded thereon coded information including a first number $n$ and a second number, the former expressing the number of times of use of said card, comprising: means for reading said first and second numbers; a first register for storing said first number; a second register for storing said second number; means associated with said first register to produce a value of the function $n+1$ and a first random number $R_{n+1}$ and a second random number $$\sum_{1}^{n} R_n;$$

a third register for storing the value of the function $n+1$; a fourth register for storing the first random number $R_{n+1}$; a fifth register for storing the second random number $$\sum_{1}^{n} R_n;$$

means operated by the user of said card to enter a third number; a sixth register for storing said entered third number; an adder for adding said second number stored in said second register and said second random number $$\sum_{1}^{n} R_n$$

stored in said fifth register to produce a fourth number; means for comparing said third number and said fourth number to recognize said user as the proper owner of said card when said third and fourth numbers coincide; a subtractor for subtracting said first random number $R_{n+1}$ stored in said fourth register from said second number stored in said second register to produce a fifth number; and means for recording said fifth number and the value of said function $n+1$ stored in said third register on said card in place of said second and first numbers previously recorded thereon, respectively.

9. The system of claim 1, wherein said first code is mathematically independent of said card owner code and said second code is mathematically related to said card owner code by a predetermined mathematical quantity, said predetermined mathematical quantity being determined by said first code.

10. A system for checking the user of a card having recorded thereon coded information including at least a first and second code, comprising: means for reading said codes; function generating means responsive to said first code read by said reading means to produce a third code, said third code having a predetermined mathematical relationship with said first code, said function generating means performing a predetermined mathematical operation so as to produce said third code; means operated by the user of said card to enter a card owner code; computational means responsive to said reading means and said function generating means for mathematically combining said second code with said third code, said computational means including coincidence checking means for comparing said entered card owner code with said mathematically combined second and third codes, said coincidence checking means supplying a control signal when said entered card owner code corresponds to said mathematically combined second and third codes; and code changing means responsive to said control signal supplied by said coincidence checking means for changing both said first and second codes on said card, said code changing means changing said first and second codes such that said mathematically combined second and third codes will correspond to said card owner code the next time said card is used in said system.

11. A card actuated system wherein each authorized user of said system is issued a card owner number and a card having recorded thereon at least a first code that is mathematically independent of said card owner number and a second code that is mathematically related to said card owner number by a predetermined mathematical quantity, said system comprising: means for reading said first and second codes from said card; means responsive to said first code read by said reading means to produce a third code, said third code having a predetermined mathematical relationship with said first code; means operated by the user of said card to enter said card owner number; computational means responsive to said reading means and said means for producing said third code for mathematically combining said second code with said third code, said computational means including coincidence checking means for comparing said entered card owner number with said mathematically combined second and third codes, said coincidence checking means supplying a control signal when said entered card owner number corresponds to said mathematically combined second and third codes; and code changing means responsive to said control signal supplied by said coincidence checking means for changing both said first and second codes on said card, said code changing means changing said first and second codes such that said mathematically combined second and third codes will correspond to said card owner number the next time said card is used in said system.

12. The card actuated system of claim 11, wherein said means for producing said third code comprises function generating means responsive to said first code read by said reading means, said function generating means performing a predetermined mathematical operation so as to produce said third code.

13. The card actuated system of claim 11, wherein said means for producing said third code comprises a storage which is addressed by said first code read by said reading means to produce said third code.

14. The card actuated system of claim 13, wherein said first code expresses an alphabetic letter corresponding to the number of times of use of said card.

15. The card actuated system of claim 11, wherein said means for producing said third code comprises a storage which stores random numbers which are addressed by said first code read by said reading means so as to be supplied as said third code.

16. The card actuated system of claim 15, wherein said first code expresses an alphabetic letter corresponding to the number of times of use of said card.

17. The card actuated system of claim 11, wherein said first code expresses the number of times of use of said card, and said means for producing said third code receives said first code to produce said third code.

18. The card actuated system of claim 17, wherein said code changing means increases said number of times of use by one when said card has been used and at the same time changes said second code so that said correspondence will exist when said card is checked by said coincidence checking means the next time said card is used.

19. In a system operable by a card having recorded thereon at least a first and second code representative of a card owner code assigned to each card owner, the method of verifying that a user of said card has entered the correct card owner code comprising the steps of:
reading said first and second codes on said card when said card is used in said system;
generating a third code mathematically related to said first code;
combining said second code with said third code by a predetermined mathematical operation;
comparing said combined second and third code with said card owner code; and
changing said first and second codes on said card when said combined second and third codes correspond to said card owner code.

20. The method of claim 19, wherein said first code is the number of times said card has been used in said system and said step of changing said first and second codes includes steps of:
increasing said number of times said card has been used by one:
changing said second code such that correspondence will exist between said card owner code and said mathematically combined second and third codes the next time the card is used in said system.

* * * * *